United States Patent [19]

Walz

[11] Patent Number: 4,888,055

[45] Date of Patent: Dec. 19, 1989

[54] USE OF AN AGENT FOR PRODUCTION OF A CONSTANT COATING THICKNESS DURING CATHODIC ELECTROCOATING

[75] Inventor: Gerd Walz, Wiesbaden, Fed. Rep. of Germany

[73] Assignee: Hoechst AG, Fed. Rep. of Germany

[21] Appl. No.: 901,184

[22] Filed: Aug. 27, 1986

[30] Foreign Application Priority Data

Aug. 29, 1985 [DE] Fed. Rep. of Germany ....... 3530843

[51] Int. Cl.$^4$ .............................................. B05B 7/00
[52] U.S. Cl. ................................................. 106/1.05
[58] Field of Search ........................ 106/1.05; 560/24; 204/181

[56] References Cited

U.S. PATENT DOCUMENTS 4,268,683  5/1981  Gurgiolo .

FOREIGN PATENT DOCUMENTS 0102566  3/1984  European Pat. Off. .
0120466  10/1984  European Pat. Off. .
0121837  10/1984  European Pat. Off. .
0149156  10/1984  European Pat. Off. .

Primary Examiner—Josephine Barr
Attorney, Agent, or Firm—Bierman and Muserlian

[57] ABSTRACT

Coating composition comprising a reaction product of primary monoamines and cyclic monocarbonates in the molar ratio 1:0.8 to 0.8:1 as agent for the production of a constant coating thickness in cathodic electrocoating and a process for the preparation of the coating composition in the form of coating pastes or dip baths.

7 Claims, No Drawings

USE OF AN AGENT FOR PRODUCTION OF A CONSTANT COATING THICKNESS DURING CATHODIC ELECTROCOATING

During the coating of substrates using the cathodic electrocoating process (CEC), it is desirable that a coating thickness which is constant over a period of weeks is obtained when the films are deposited from the bath.

It is known that the coating thickness is regulated using solvents which are either not completely water-miscible or are completely insoluble in water. These solvents (for example ethylene glycol monohexyl ether, phenoxypropanol, 2,2,4-trimethylpentane-1,3-diol monoisobutyrate, etc.) are added to the CEC batch.

The coating thickness can also be regulated using commercially available plasticizers, which are scarcely volatile under the stoving conditions. Examples of these are dioctyl phthalate, dibutyl phthalate, n-alkyl esters of fatty acids having up to 18 carbon atoms in the alkyl radical, or other customery plasticizers.

It is also known that the coating thicknesses of cathodic electrocoatings can be altered by increased amounts of the above additives in such a fashion that they are regarded as so-called thick-layer coatings (coating thicknesses between 30 and 70 $\mu$m).

However, the use of solvents has the disadvantage that they evaporate from open baths relatively quickly, and must therefore constantly be topped up to keep the composition of the baths constant. In addition, these volatile (particularly under stoving conditions) solvents represent a considerable environmental pollutant.

When these solvents are used to produce thicker coatings, the situation is even more unfavorable in this respect due to the increased amounts of these compounds which are present.

If, in contrast, plasticizers which are, in general, non-volatile or scarcely volatile under stoving conditions are employed for the regulation of the coating thickness or to produce thick-layer coatings, the constancy of the coating thickness is ensured, even without topping up, and, in addition, the environmental pollution caused by such compounds is low. However, since these plasticizers remain in the deposited and hardened film, they have a negative influence on the quality of the latter, and in particular the corrosion protection properties of such films are considerably impaired.

In order to circumvent the disadvantages mentioned, it was desirable to find agents for the achievement of a constant coating thickness in cathodic electrocoating which, on the one hand, are non-volatile or only slightly volatile, and thus substantially remain in deposited and stoved film, but on the other hand do not influence the technological properties negatively.

The invention therefore relates to the use of a reaction product from primary monoamines and cyclic monocarbonates in the molar ratio from 1:0.8 to 0.8:1, preferably in the ratio 1:1, for the production of a constant coating thickness in cathodic electrocoating.

The production of a constant coating thickness, even when the baths are used for a relatively long period, should be mentioned as a particular advantage of the use of the reaction product in the baths of cathodic dip-coating. Furthermore, the coating thicknesses can be increased to about 50 $\mu$m, which itself means an improvement of the coating. The coating thickness regulators are employed, in general, in amounts from 0.2 to 3, preferably 0.5 to 2%, relative to the bath charge.

Primary monoamines have the formula $H_2N-R$, in which R is a branched or unbranched alkyl or alkoxyalkyl radical having 2–18 carbon atoms, preferably 2–14 carbon atoms, in the alkyl radical. Further usable amines are cycloaliphatic and araliphatic monoamines having up to 10 carbon atoms. Examples of amines employed according to the invention are n-butylamine, n-octylamine, tridecylamine, isotridecylamine, 3-methoxypropylamine, 3-(2-ethylhexoxy)-propylamine, cyclohexylamine,, benzylamine, 2-phenylthylamine, 2-methoxyphenylethylamine, etc.

Cyclic monocarbonates which can be reacted with the amines to form a urethane bond are, for example, those which contain a 1,2-carbonate group, such as alkylene carbonates having 2 to 18, preferably 2 to 12, carbon atoms in the alkylene group, for example ethylene carbonate, propylene carbonate, 1,2-butylene carbonate, and also those cyclic carbonates which are obtained by reaction of $CO^2$ with, for example, the following epoxides: higher aliphatic epoxides, such as hexene oxide, octene oxide, dodecene oxide and octadecene 1-oxide.

Further carbonates which can be employed according to the invention have been prepared, for example, from epoxy components which have a terminal 1,2-epoxy group. These are preferably those compounds which contain a substituted or non-substituted glycidyl ether group or glycidyl ester group, for example n-butyl glycidyl ether, ethylhexyl glycidyl ether, and monoglycidyl ethers of higher isomeric alcohols. Examples of glycidyl esters are those of aliphatic or aromatic, saturated or unsaturated monocaraboxylic acids such as aliphatic monocarboxylic acids having 3 to 18, preferably 3 to 12, carbon atoms, acrylic acid, methacrylic acid, benzoic acid etc. A very common commercially available glycidyl ester is a mixture of saturated monocarboxylic acids having a chain length of 9 to 11 carbon atoms, mainly comprising (about 94%) tertiary acids (Versatic acid glycidyl ester).

Also suitable are monoglycidyl ethers of monohydric phenols, for example phenol($C_6H_5OH$), and alkylphenols having 1 to 18, preferably 1 to 12, carbon atoms in the branched or unbranched alkyl radical, and polyhydric alcohols, such as ethylene glycol, propylene glycol, butyl glycol, neopentyl glycol, hexylene glycol, and the like, fr example phenyl glycidyl ether, p-tert-butylphenyl glycidyl ether and o-cresyl glycidyl ether.

Further monoepoxides which are suitable for the reaction are described in German Patent Application Nos. P 3,529,263.6 and P 3,600,602.5 "Process for the preparation of 2-oxo-1,3-dioxolanes", in which the preparation of the cyclic monocarbonates used here is also described, to which reference is herewith made, including the preferred embodiments.

In the examples which follow brackets (P) denotes parts by weight and (%) denotes percent by weight.

EXAMPLES 1. 199.4 of tridecylamine were initially introduced into a 1-liter reaction flask, fitted with stirrer and reflux condenser, and heated to 80° C. 102P of propylene carbonate were subsequently slowly added dropwise at such at rate that 90° C. was not exceeded, and the reactants were maintained at 80° C. for about 6 hours until an amine number of about 10 was reached. The almost colorless, viscous liquid obtained had a stoving residue of 96% (DIN 53 216, 1 hour at 125° C.).

The examples 2 to 10 (according to Table 1) which follow were prepared as described in Example 1.

TABLE 1

| Example | Amine | Amount (P) | Carbonate | Amount | Reaction product solid | Reaction product liquid | Stoving residue (%) |
|---|---|---|---|---|---|---|---|
| 2 | n-octyl | 102 | ethylene | 88 | — | + | 95 |
| 3 | isotridecyl | 199.4 | ethylene | 88 | — | + | 97 |
| 4 | $C_{18}$— | 270 | propylene | 102 | + | — | 98 |
| 5 | $_oC_{12}$— | 193 | propylene | 102 | + | — | 95 |
| 6 | n-butyl | 102 | Versatic[1] | 401 | — | + | 96 |
| 7 | n-octyl | 161 | Versatic[1] | 358 | — | + | 97 |
| 8 | tridecyl | 209 | Versatic[1] | 301 | — | + | 94 |
| 9 | n-octyl | 129 | Dodecene 1-oxide | 242 | — | + | 94 |
| 10 | n-octyl | 129 | 2-ethylhexyl glycidyl ether | 230 | — | + | 97 |

[1]Versatic acid glycidyl ester

The reaction products were employed as coating thickness regulators in CEC baths. For this purpose, they were either added to the materials of the electrophoresis baths before they were transferred into water—they were thus added to the coating pastes—or they are added alone or in mixtures with water-miscible or partially water-miscible solvents, such as ethylene glycol monoethyl ether or methoxypropanol, to the prepared CEC baths (dip baths). It is thus possible both to incorporate the reaction products into the coating pastes and also to add them to the dip baths.

Various known compositions were employed as electrophoresis baths, for example the bath according to Application Example 11 of German Patent Application No. P 3,417,411.9. The amine-containing polymers employed were prepared as follows:

3.6P of dimethylaminopropylamine
16.1P of 2-ethylhexylamine mixture I
79.2P of ethylene glycol monoethyl ether Mixture I was heated to a temperature of about 143° C., until gentle reflux occurred, in a 2-liter flask, fitted with reflux condenser, stirrer and electric resistance heating. 317P of bisphenol A epoxide resin having an epoxide equivalent weight of 480 were dissolved in 136P of ethylene glycol monoethyl ether and slowly added dropwise to mixture I at 143° C. within 1 hour. 130P of epoxidized soya oil having a epoxide equivalent of 260 were subsequently added dropwise at 143° C. within 1 hour and the mixture was then maintained at 142° C. for a further 10 hours. A 70% strength solution of an epoxide-amine adduct in ethylene glycol monoethyl ether resulted.

The hardener component of the electrophoresis bath was prepared in two stages:

Precursor:

2,160P of hydroxyethyl acrylate having an acid number of $\leq 1$, 3.8P of zinc acetylacetonate and 422P of diglycol dimethyl ether were introduced into a reactor and heated to 60° C., 1,636P of toluylene diisocyanate were slowly added dropwise, and the temperature was maintained at 60° C. until the —N=C=O group content was less than 0.2%. 15P of hydroquinone and 422P of ethylene glycol monoethyl ether were subsequently added. An 80% strength, clear, viscous resin having a double bond content of 9.5% (relative to the solution) was obtained.

Hardener:

1,016P of 80% strength precursor and 10P of KOH, 30% strength in methanol, were initially introduced into a reactor and heated to 80° C., and 132P of dimethyl malonate were slowly added dropwise at such a rate that 80° C. was not exceeded. The mixture was maintained at 80° C. until the double bond —C=C— content had fallen to 4.2%. The reaction mixture was diluted to 80% solid using ethylene glycol monoethyl ether and 2.0 g of acetic acid were added, a viscous, yellowish resin being obtained.

In order to demonstrate that the addition of the coating thickness regulators can be generally employed in electrophoresis baths of various compositions with equally good results, Example 6, Table 1 of European Patent Application No. 0,012,463 and Example I C of European Patent Application No. 0,012,566 were included in the investigation, the stated bath compositions and deposition conditions being observed in each case.

The preparation of the electrophoresis baths was carried out in such a manner that the amounts of the optionally pigmented epoxide-amine adducts were initially homogenized, using a high-speed stirrer, with the stated amounts of hardener and catalysts and also the appropriate acid and the coating thickness regulators to be employed if appropriate, and demineralized water was subsequently added slowly until the solids content of the electrophoresis baths corresponded to the values indicated in the examples in each case. For the electrophoretic deposition, a plastic tank having an anode of stainless steel and a sheet, connected as the cathode, having a zinc phosphate bonding coating (cathode to anode spacing 5 cm, cathodes:anodes ratio 1:1) was filled with the appropriate electrophoresis bath and—after a bath maturing time of 24 hours or 4 weeks—the deposition was carried out by applying a DC voltage (see Table 2) for 2 minutes. The films deposited were rinsed with demineralized water and subsequently stoved for 20 minutes at 180° C. Table 2 also shows the coating properties obtained.

TABLE 2

Influence of coating thickness regulators on the coating thickness

| Example | Coating thickness regulator Amount (%) | Coating thickness regulator from Example | Deposition voltage | Deposition temperature | Coating thickness after 24 hours Bath ageing | Coating thickness after 4 weeks Bath ageing | Corrosion protection on Bonder 132, underrusting after 600 hours salt spray test ASTM B 117-64 |
|---|---|---|---|---|---|---|---|
| Bath corresponds to Example 11, P 3, 417, 441.9, 14% solid ||||||||
| 11 (comp.) | — | — | 250 V | 28° C. | 18 μm | 16 μm | about 1 mm |
| 12 | 1 | 1 | 250 V | 28° C. | 30 μm | 30 μm | about 1 mm |
| 13 | 2 | 1 | 250 V | 28° C. | about 50 μm | about 50 μm | about 1 mm |
| 14 | 2 | 6 | 250 V | 28° C. | about 45 μm | about 42 μm | about 1 mm |
| 15 | 1.5 | 7 | 250 V | 28° C. | about 40 μm | about 38 μm | about 1 mm |
| 16 | 1.2 | 9 | 250 V | 28° C. | about 38 μm | about 38 μm | about 1 mm |
| 17(comp.) | 1 | EGMHE* | 250 V | 28° C. | about 28 μm | about 20 μm | about 1 mm |
| 18(comp.) | 1 | Texanol** | 250 V | 28° C. | about 30 μm | about 21 μm | about 1 mm |
| Bath corresponds to Example 6, Table 1, European Patent Application 0,012,463, 10% solid ||||||||
| 19(comp.) | — | — | 200 V | 28° C. | 17 μm | 15 μm | 1-2 mm |
| 20 | 1 | 4 | 180 V | 28° C. | 31 μm | 30 μm | 1-2 mm |
| 21 | 2 | 6 | 180 V | 28° C. | 41 μm | 42 μm | 2 mm |
| 22 | 1 | 8 | 170 V | 28° C. | 28 μm | 28 μm | 1-2 mm |
| 23(comp.) | 2 | EGMHE* | 180 V | 28° C. | 35 μm | about 20 μm | 1-2 mm |
| Bath corresponds to Example IC, European Patent Application 0,102,566, 15% solid ||||||||
| 24(comp.) | — | — | 100 V | 22° C. | 15 μm | 15 μm | 2 mm |
| 25 | 1 | 1 | 100 V | 22° C. | 27 μm | 26 μm | 2 mm |
| 26 | 1 | 2 | 100 V | 22° C. | 23 μm | 22 μm | 2 mm |
| 27(comp.) | 1 | Texanol** | 100 V | 22° C. | 28 μm | 19 μm | 2 mm |

*EGMHE = ethylene glycol monohexyl ether
**Texanol = 2,2,4-trimethylpentane-1,3-diol monoisobutyrate

RESULTS AND DISCUSSION

The additives for coating thickness regulation proved effective for all CEC baths which were tested, irrespective of the composition of the binders originating from the various manufacturers. Whereas the coating thickness of the comparison examples decreased considerably after a bath aging period of 4 weeks when solvents were added, the coating thicknesses of Examples 12-16, 20-22 and 25-26 which were treated with the coating thickness regulators according to the invention remained excellently constant.

The addition of 1% of the substances according to the invention to the electrophoresis baths causes a significant increase in the coating thicknesses compared to the blank samples (Comparison Examples 11, 19 and 24). If this amount is increased to 2%, coating thicknesses of up to 50 μm result, which can be regarded as thick-layer coatings. As further experiments showed, greater amounts do not show any notable increase in the coating thickness.

The corrosion protection was not negatively influenced by the coating thickness regulators employed, but instead remained at the values which are achieved by the current state of the art.

I claim:

1. An aqueous coating composition for cathodic electrocoating containing a synthetic resin, a hardener and conventional additives, the improvement comprising as an additional component acting as a coating thickness regulator, a reaction product of primary monoamines of the formula R-NH$_2$ where R is selected from the group consisting of alkyl and alkoxy of 2 to 18 carbon atoms, cycloaliphatic of up to 10 carbon atoms and araliphatic of up to 10 carbon atoms and cyclic monocarbonates in the molar ratio of 1:0.8 to 0.8:1, wherein the monocarbonate is an alkylene carbonate having 2 to 18 carbon atoms in the alkylene group or is one which has been prepared from compounds which contain a substituted or non-substituted glycidyl ester or glycidyl ether group.

2. Coating composition as claimed in claim 1 in the form of coating pastes or dip baths.

3. Coating composition as claimed in claim 1, wherein the reaction product comprises stoichiometric amounts of amine and carbonate.

4. Coating composition as claimed in claim 1, wherein the primary monoamine of the reaction product has the formula H$_2$N-R, in which R is a branched or unbranched alkyl or alkoxyalkyl radical having 2-14 carbon atoms in the alkyl radical.

5. Coating composition as claimed in claim 1, wherein the monoamine of the reaction product is the cycloaliphatic amine having up to 10 carbon atoms.

6. Coating composition as claimed in claim 1, wherein in the reaction product n-butylamine, n-octylamine, tridecylamine, isotridecylamine, C$_{12}$-amine or C$_{18}$-amine are employed as amine and ethylene carbonate, propylene carbonate, the carbonate of dodecene 1-oxide, of 2-ethylenehexyl glycidyl ether or of Versatic and glycidyl ester is employed as carbonate.

7. Coating composition as claimed in claim 1, wherein the reaction product is employed in amounts from 0.2 to 3, preferably 0.5 to 2%, relative to the bath charge.

* * * * *